(12) United States Patent
Antoun

(10) Patent No.: US 7,959,803 B2
(45) Date of Patent: Jun. 14, 2011

(54) DEVICES, SYSTEMS AND METHODS FOR SECURING AND SEALING FILTER MEDIA ELEMENTS IN SEPARATION SYSTEMS

(76) Inventor: Gregory S. Antoun, Meadville, PA (US)

( * ) Notice: Subject to any disclaimer, the term of this patent is extended or adjusted under 35 U.S.C. 154(b) by 1680 days.

(21) Appl. No.: 11/149,672

(22) Filed: Jun. 10, 2005

(65) Prior Publication Data

US 2006/0278572 A1  Dec. 14, 2006

(51) Int. Cl.
- B01D 29/11 (2006.01)
- B01D 29/13 (2006.01)
- B01D 29/25 (2006.01)
- B01D 29/27 (2006.01)

(52) U.S. Cl. ........ 210/232; 210/445; 210/450; 210/451; 210/452; 210/453; 210/474

(58) Field of Classification Search .......... 210/232, 210/445, 450, 451, 452, 474, 477, 453
See application file for complete search history.

(56) References Cited

U.S. PATENT DOCUMENTS

| | | | |
|---|---|---|---|
| 3,314,542 A | 4/1967 | Kudlaty | |
| 3,387,433 A * | 6/1968 | Mackey | ........................ 55/356 |
| 3,618,776 A | 11/1971 | Kudlaty | |
| 3,819,052 A | 6/1974 | Firth | |
| 3,931,015 A * | 1/1976 | Jenkins | ........................ 210/232 |
| 4,157,964 A * | 6/1979 | Rishel | ........................ 210/238 |
| 4,212,739 A | 7/1980 | Hilton | |
| 4,279,746 A | 7/1981 | Leutz | |
| 4,970,004 A | 11/1990 | Rosaen | |
| 5,389,246 A | 2/1995 | Zinga | |
| 5,462,678 A | 10/1995 | Rosaen | |
| 5,770,066 A | 6/1998 | Coates | |
| 5,848,862 A | 12/1998 | Antoun | |
| 5,879,545 A | 3/1999 | Antoun | |
| 5,893,973 A | 4/1999 | Antoun | |
| 5,951,216 A | 9/1999 | Antoun | |
| 5,988,952 A | 11/1999 | Antoun | |
| 6,045,300 A | 4/2000 | Antoun | |
| 6,533,509 B1 | 3/2003 | Antoun | |
| 6,632,371 B2 | 10/2003 | Olson | |
| 6,949,188 B2 * | 9/2005 | Geyer | ........................ 210/232 |
| 2004/0031745 A1 | 2/2004 | Moessinger | |

* cited by examiner

*Primary Examiner* — Thomas M Lithgow
(74) *Attorney, Agent, or Firm* — Bartony & Associates, LLC

(57) ABSTRACT

A device for securing a filter element within a housing of a separation system, wherein the housing has an inner wall and includes therein a filter seating to seat the filter element, includes at least one sealing member adapted to form a sealing connection with the filter element and a sealing connection with the inner wall of the housing. The device further includes at least one compression member to compress the elastomeric sealing member to form the sealing connection with the filter and the sealing connection with the inner wall of the housing.

16 Claims, 6 Drawing Sheets

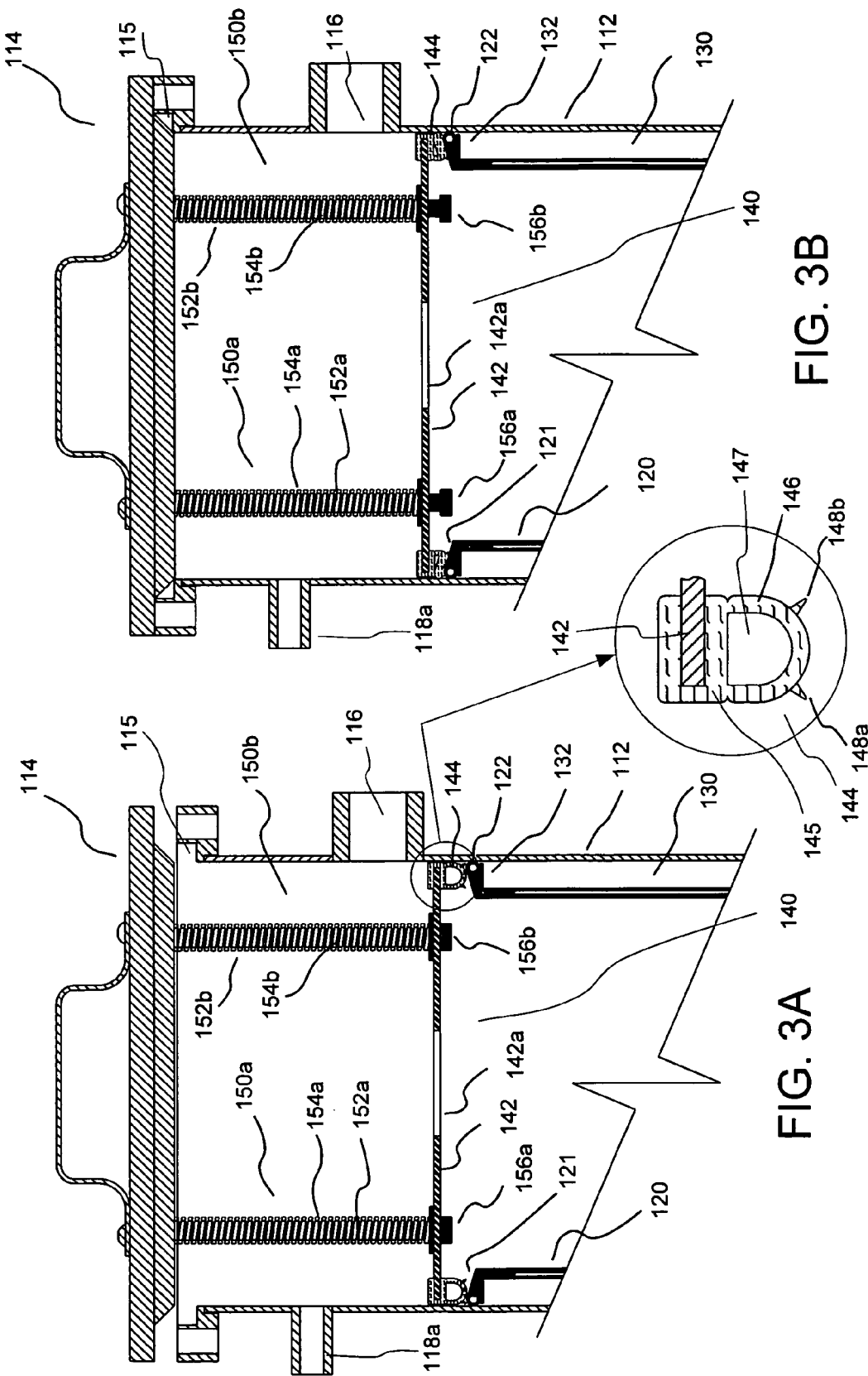

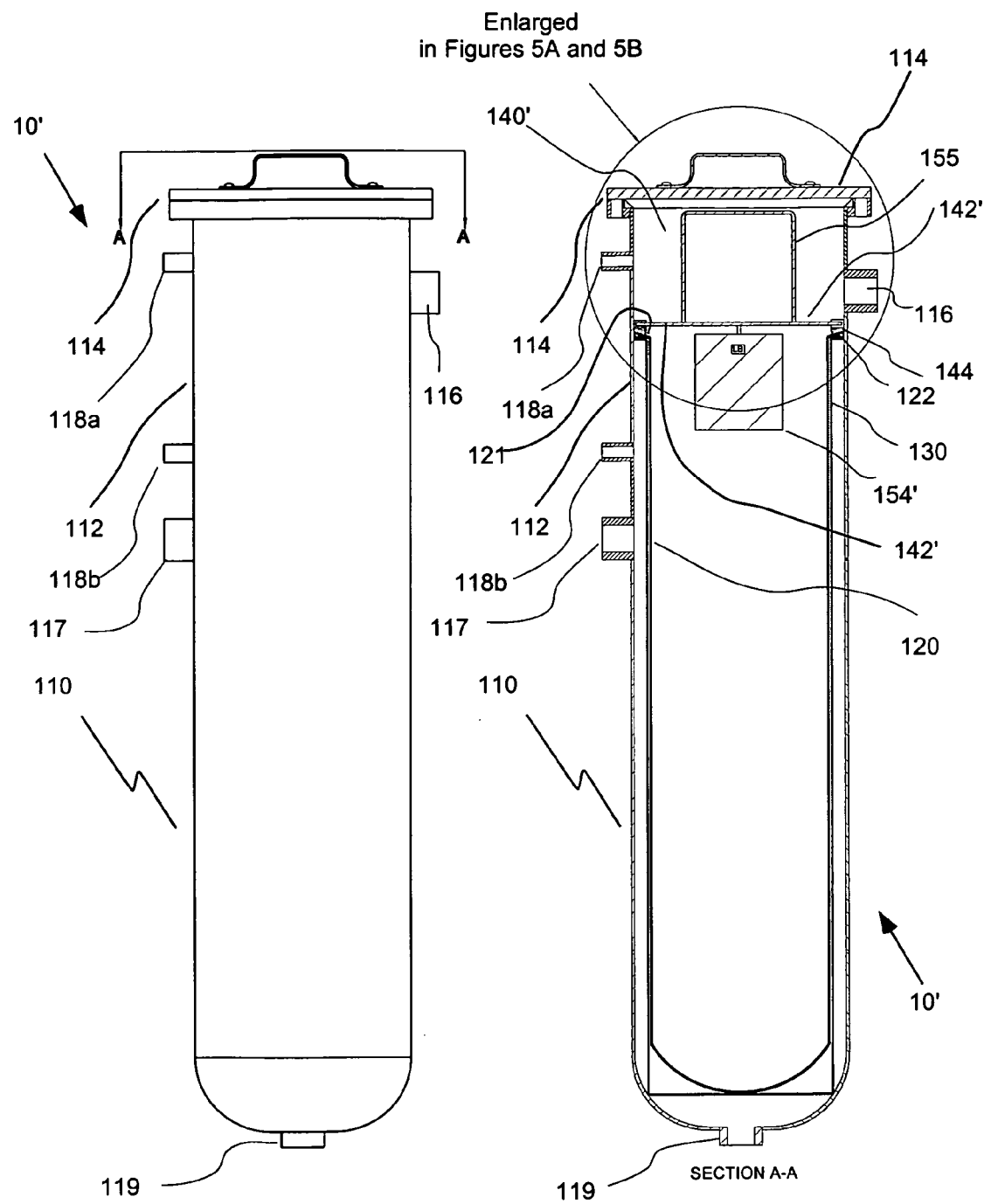

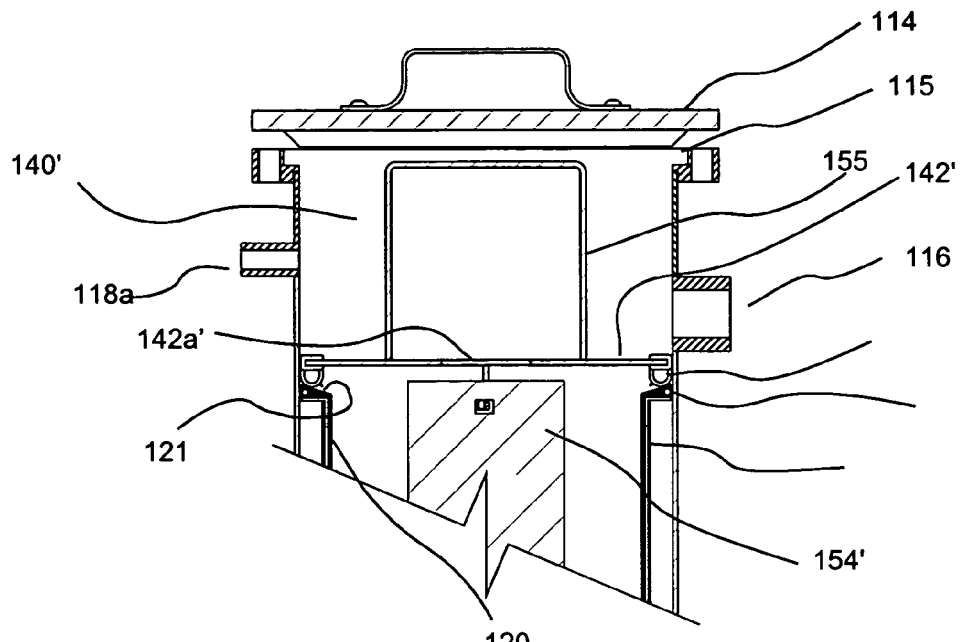
Fig. 5A
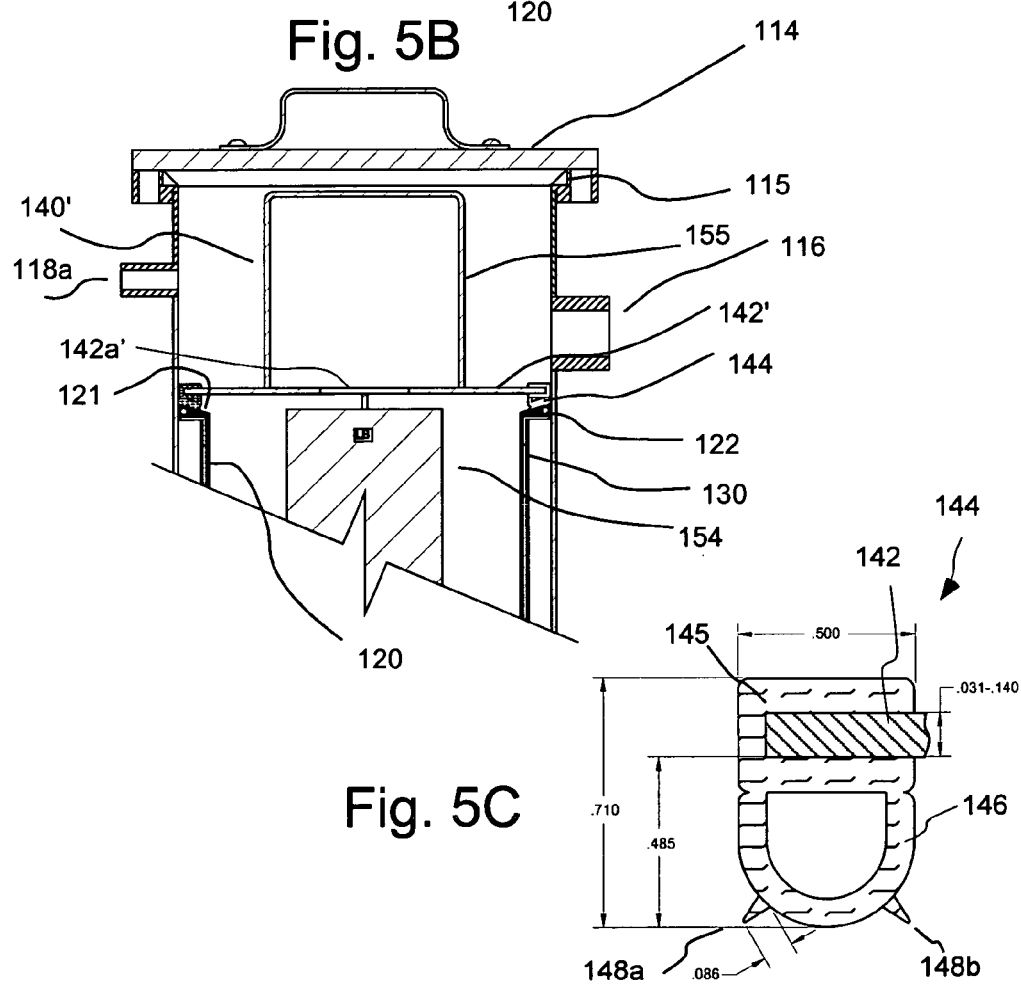
Fig. 5B
Fig. 5C

DEVICES, SYSTEMS AND METHODS FOR SECURING AND SEALING FILTER MEDIA ELEMENTS IN SEPARATION SYSTEMS

FIELD OF THE INVENTION

The present invention relates to devices, systems and methods for securing and sealing filter media in separation systems, and, particularly to devices, systems and methods for securing filter media elements in separations systems for the separation of particulates from fluids.

BACKGROUND OF THE INVENTION

In a number of situations arising in many settings, it is desirable to separate mixtures of materials. For example, it is often desirable to remove particles from a liquid "contaminated" with such particles. For example, in the machining industry coolant liquid becomes contaminated with metal particles. Such particles can be separated using filter media elements such as filter bags, baskets and cartridges which separate by size exclusion.

As illustrated in FIGS. 1A through 1C, a number of currently available separation systems represented by system 10, include a separation media element/bag 20 supported by a screened basket-shaped support 30. In general, current practice in such systems is to rely on a metal or plastic ring 22 on the top perimeter of filter bag 20 to seal itself to the sidewall of a generally cylindrical filter housing 12. Filter housing 12 is closed at a top portion thereof by a lid 14. In the embodiment of FIGS. 1A and 1B, sealing ring 22 rests upon a radially outward extending flange 32 formed around the upper perimeter of support 30. Variation in any number of variables, including, but not limited to, filter housing diameter and/or roundness, fabric thickness, sewing technique, and ring diameter and/or roundness, can cause significant bypass of dirty fluid around filter seal element 22, causing particles many times larger than the filter media rating to pass through filter element 20 and out of filter housing 12.

Some separations systems have used O-ring type seals in an attempt to limit leakage of fluid to be filtered around a filter element with limited success. See, for example, U.S. Pat. No. 5,462,678, in which an O-ring is used to form a seal between an outer sieve basket and an inner wall of a separation system housing. Indeed, although there has long been a need to decrease the amount of such leakage, currently available separation systems have been unable to satisfy that need.

It is desirable to develop improved devices, systems and methods that reduce or eliminate the above-identified and other problems associated with currently available separation systems.

SUMMARY OF THE INVENTION

In one aspect, the present invention provides a device for securing a filter element within a housing of a separation system. The housing has an inner wall and includes therein a filter seating to seat the filter element. The device includes at least one sealing member adapted to form a sealing connection with the filter element (for example, directly therewith) and a sealing connection with the inner wall of the housing (for example, directly therewith). The device further includes at least one compression member to compress the elastomeric sealing member to form the sealing connection with the filter and the sealing connection with the inner wall of the housing.

In one embodiment, the position of the compression member is variable and the device further comprises at least one biasing member to apply force to the compression member to compress the sealing member in contact with the filter element and the inner wall. The compression member can, for example, be a plate. In one embodiment, the plate is slidably positioned on at least one rod around which a biasing spring is positioned. The sealing plate can, for example, be operatively connected to a lid for the housing by the rod.

The sealing member can, for example, be formed from a layer of elastomeric material and has a void or open space (for example, a generally tubular sealing member) to facilitate deformation of the seal. In one embodiment, the sealing member is operatively connected to the compression member.

In another aspect, the present invention provides a separation system including: a housing; a filter seating within the housing; a filter element adapted to be seated within the filter seating; and a filter securing device as described above, which includes at least one sealing member adapted to form a sealing connection with the filter and a sealing connection with the inner wall of the housing. The separation system further includes at least one compression member to compress the sealing member to form the sealing connection with the filter element and the sealing connection with the inner wall of the housing.

The filter element can, for example, include an extending member that extends radially outwardly that engages a surface of the seating. The sealing member can contact the extending member. The filter of the separation system can, for example, be adapted to remove solid particles from a fluid.

In another aspect, the present invention provides a method of securing a filter element within a housing of a separation system. The housing has an inner wall and includes therein a filter seating to seat the filter element. The method includes the steps: contacting at least one sealing member adapted to form a sealing connection with the filter element and a sealing connection with the inner wall of the housing with the filter element; and compressing the sealing member to form the sealing connection with the filter element and the sealing connection with the inner wall of the housing.

In one embodiment, the filter element includes an extending member that extends radially outwardly to engage a surface of the seating. In one embodiment, the sealing member contacts the extending member. The position of the compression member can be variable and the device can further include at least one biasing member to apply force to the compression member to compress the sealing member in contact with the filter element and the inner wall. In one embodiment, the compression member is a plate. The plate can be slidably positioned on at least one rod around which a biasing spring is positioned. In one embodiment, the plate is operatively connected to a lid for the housing by the rod.

As described above, the sealing member can be formed from a layer of elastomeric material which includes a void or open space to facilitate deformation of the seal. The sealing member can be operatively connected to the compression member.

In still a further aspect, the present invention provides another device for securing a filter element within a housing of a separation system. The housing has an inner wall and includes therein a filter seating to seat the filter element. The device includes at least one sealing member adapted to form a sealing connection with the filter element and a sealing connection with the inner wall of the housing. The sealing member is formed from a layer of elastomeric material and has an open space encompassed at least in part by the layer of elastomeric material to facilitate deformation of the seal. The device further includes at least one compression member to compress the sealing member to form the sealing connection with the filter element and the sealing connection with the inner wall of the housing.

The present invention provides a significant improvement in the art. Indeed, in several studies the filter media securing and sealing devices, systems and methods of the present invention were found to reduce contaminant bypass by at least 95% when compared to a number of currently available separation systems.

BRIEF DESCRIPTION OF THE DRAWINGS

FIG. 3A illustrates an enlarged, cross-sectional view of the circled portion of the separation system of FIG. 2B, wherein the lid is not fully seated, and the seal is in an uncompressed, non-sealing state.

FIG. 3B illustrates an enlarged, cross-sectional view of the circled portion of the separation system of FIG. 2B, wherein the lid is fully seated, and the seal is in a compressed, sealing state.

FIG. 4A illustrates a side view of another embodiment of a filter or separation system of the present invention.

FIG. 4B illustrates a side, cross-sectional view of the separation system of FIG. 4A.

FIG. 5A illustrates an enlarged, cross-sectional view of the circled portion of the separation system of FIG. 4B, wherein the lid and compression member are not fully seated, and the seal is in an uncompressed, non-sealing state.

FIG. 5B illustrates an enlarged, cross-sectional view of the circled portion of the separation system of FIG. 2B, wherein the lid and compression member are fully seated, and the seal is in a compressed, sealing state.

FIG. 5C illustrates an embodiment of a seal member used in several studies of the present invention and provides the dimensions thereof in inches.

DETAILED DESCRIPTION OF THE INVENTION

Figures 1A, 1B:
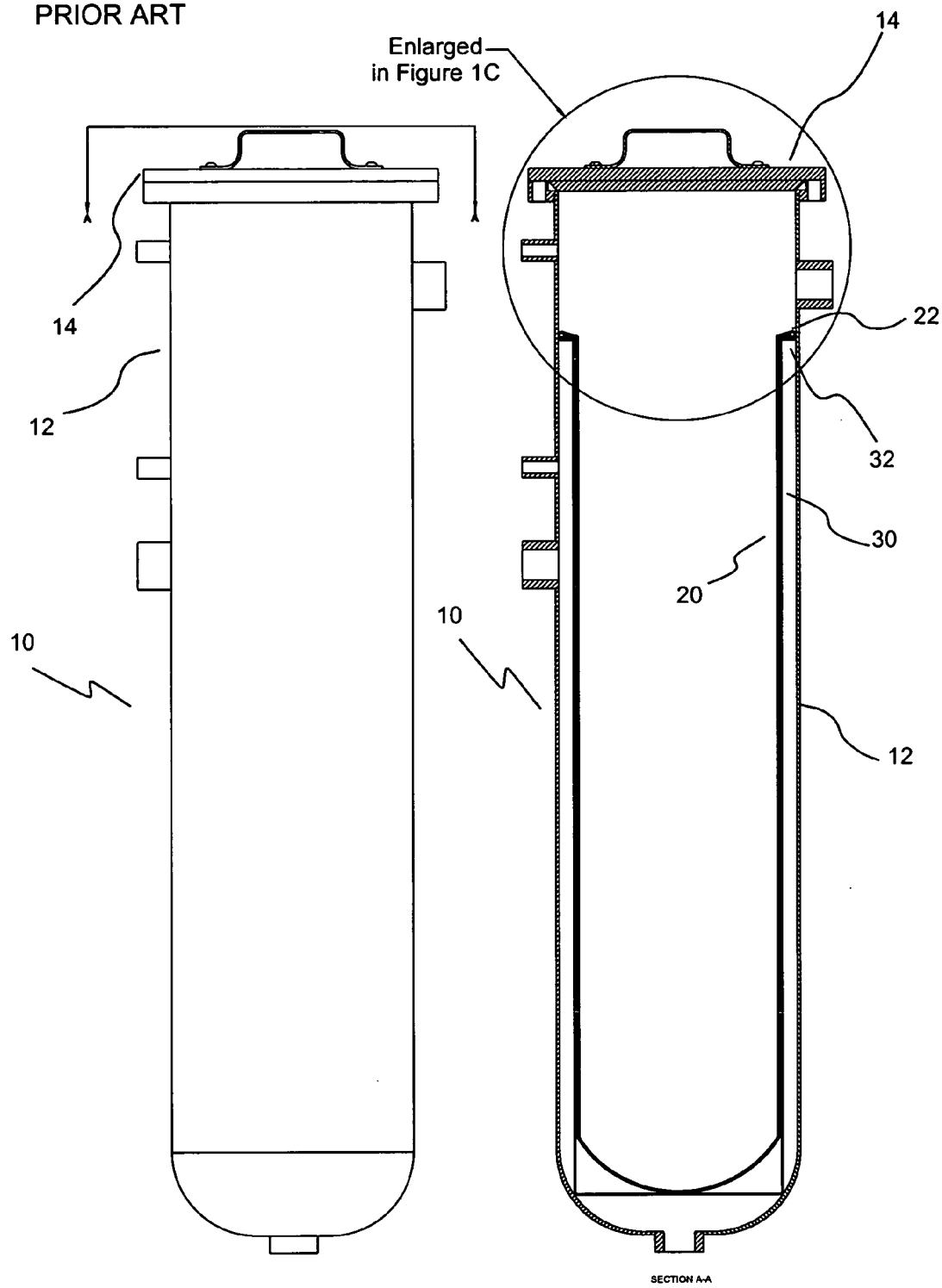
FIG. 1A illustrates a side view of a currently available separation or filter system.
FIG. 1B illustrates a side, cross-sectional view of the separation system of FIG. 1A.
Figure 1C:
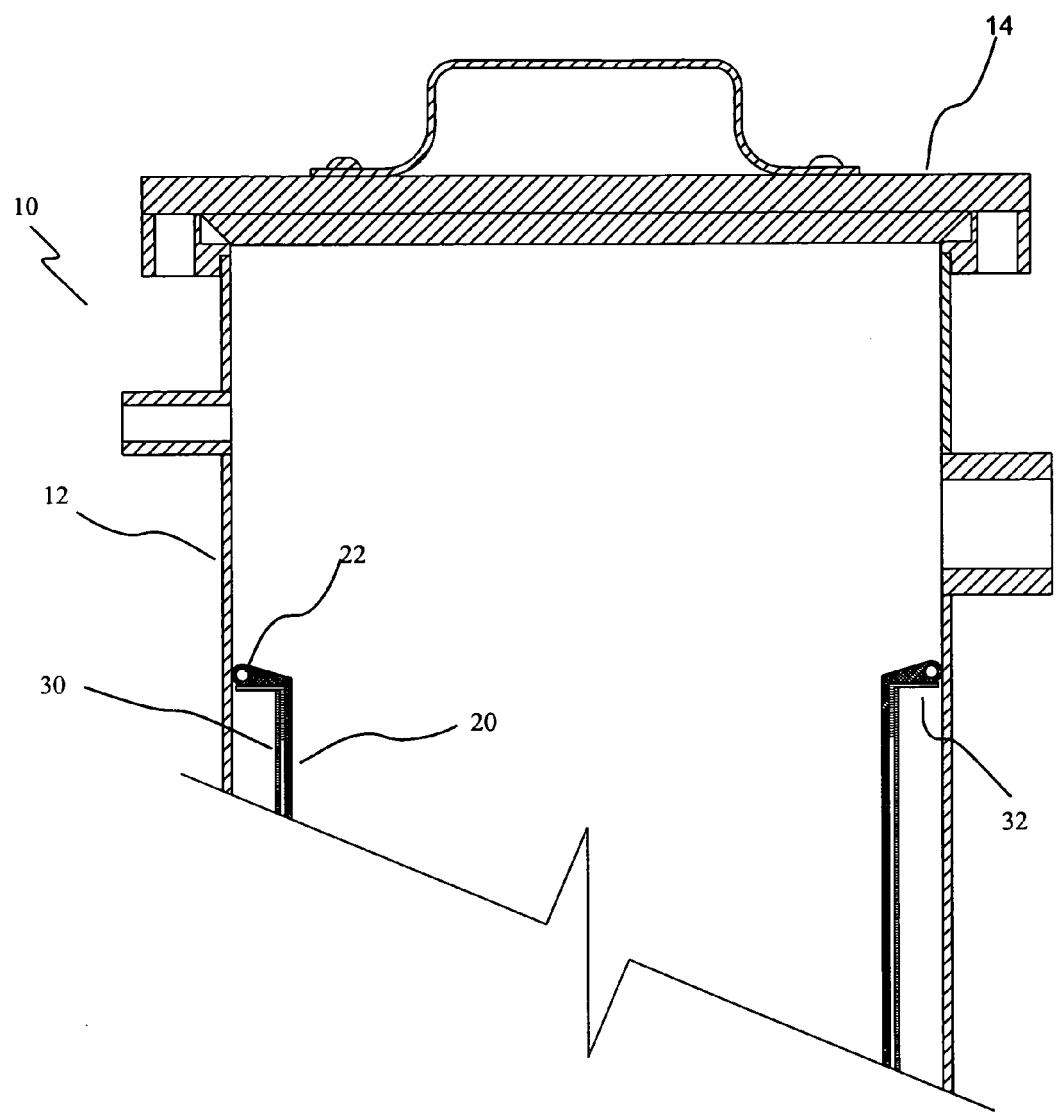
FIG. 1C illustrates an enlarged, cross-sectional view of the circled portion of the separation system of FIG. 1B.
Figures 2A, 2B:
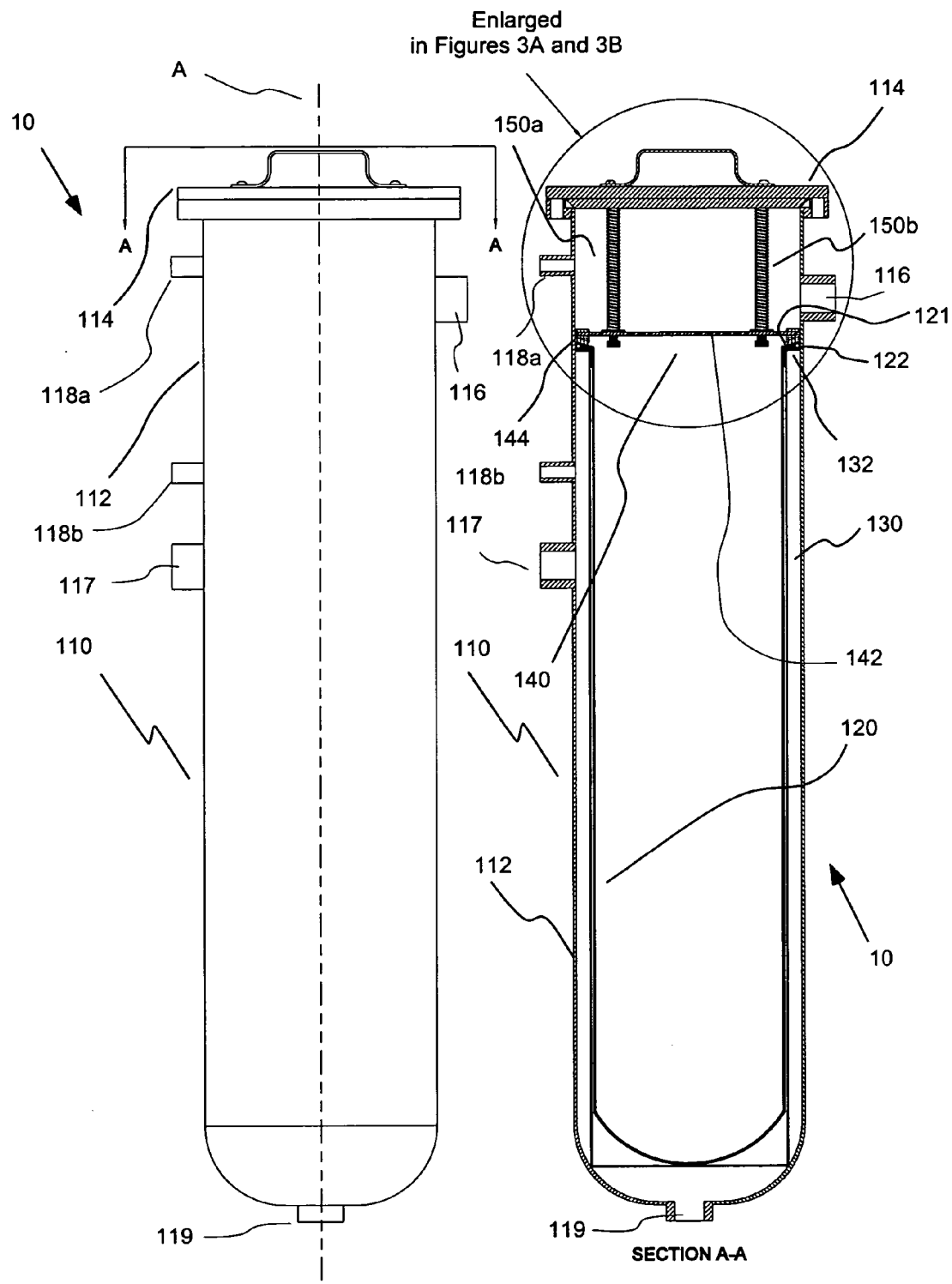
FIG. 2A illustrates a side view of one embodiment of a filter or separation system of the present invention.
FIG. 2B illustrates a side, cross-sectional view of the separation system of FIG. 2A.

FIGS. 2A through 3B illustrate one embodiment of a separation system 110 of the present invention. Separation system 110 can, for example, be used to remove particulates from a fluid (such as metal particles from coolant liquid in the machining industries). In this embodiment, separation system 110 includes a generally cylindrical housing 112 (formed around an axis A (see FIG. 2A), but not necessarily symmetrically therearound) that is closed on the top thereof with a generally circular lid 114. One skilled in the art appreciates that housing 112 and separation system 110 can be formed in many different shapes and sizes. A screened (or otherwise adapted to allow fluid flow therethrough) basket or support 130 is positioned within housing 112 to support a filter media element/bag 120. Filter media element 120 includes a radially outward extending portion 121 formed on the upper (open) perimeter thereof that can include a generally annular flange or ring 122 (for example, formed of a metal or a plastic).

Housing 112 includes an inlet 116 through which fluid to be filtered enters housing 112. Filtered fluid which has passed through filter media element 120 exits housing 112 through outlet 117. Housing 112 further includes a first pressure transducer port 118a via which inlet pressure can be measured and a second pressure transducer port 118b via which outlet pressure can be measured. The difference between the inlet pressure and the outlet pressure provides a measure of the degree to which filter element 120 has become clogged. Housing 119 also includes a valved drain outlet 119 which can be used in cleaning separation system 110.

In one embodiment of the present invention, a sealing and support or securing device 140 includes a compression or abutment member such as an annular plate 142 and a cooperating flexible or resilient (for example, elastomeric) seal 144 to secure and seal filter media element 120 within filter housing 112 of filtering or separation system 110. In one embodiment, seal 144 was formed as annular member having an annular seating 145 adapted to encompass the perimeter of support or abutment plate 142. Annular plate 142 included an opening 142a through which fluid from inlet 116 passes to contact and be filtered by filter element 120.

In the illustrated embodiment, device 140 of the present invention holds filter media element 120 in place within generally cylindrical housing 112 of the separation system 110 by applying an axially downward (in the orientation of FIGS. 2A through 3B) force on annular ring 122 to secure annular ring 122 against flange 132 of screened basket support 130. In addition, elastomeric seal 144 deforms to form a seal with the interior wall of filter housing 112. The resultant double compression seal substantially reduces or even eliminates bypass of contaminants which often occurs in currently available separation systems.

As illustrated in FIGS. 2A through 3B, when compressed with the proper force, seal 144 functions optimally, sealing the top of the filter element 120 and the sidewall of filter housing 112. This force can be applied in a number of ways that depend on the application. The components of device 140 and the other components of separation system 110 can, for example, be manufactured to tolerances that cause device 140, when fully seated, to compress elastomeric seal 144 properly. However, this result can be difficult and expensive to achieve. In the embodiment of FIGS. 2A through 3B, plate 142 or other support structure is biased (for example, spring loaded) or weighted to apply force in a desired range of forces upon seal 144. This embodiment allows for variations in a number of variables, including, but not limited to, dimension, location and shape of filter element 120 and housing 112. The spring loading or other biasing maintains sufficient force on elastomeric seal 144 to form a seal over a range of values of such variables.

In the embodiment of FIGS. 2A through 3B, force is applied to seal 144 using one or more biasing elements 150a and 150b disposed between lid 114 and support or abutment plate 142. Basing elements 150a and 150b include alignment posts or rods 152a and 152b, respectively. Each of posts 152a and 152b, respectively, includes a compression spring 154a and 154b therearound. Abutment plate 142 is, for example, secured in slidable connection with posts 152a and 152b via end elements such as bolts 156a and 156b, respectively.

When filter lid 114 is securely seated within seating 115 (see FIGS. 3A and 3B), seal 144 is brought into contact with filter media element ring 122. Support plate 142 is free to slide axially away from ring 122 (upward in the orientation of FIGS. 2A through 3B). However, springs 154a and 154b ensure application of an axially oriented force in a desired range (as easily and readily determined by one skilled in the art for a particular application) toward ring 122 to ensure that seal 144 is sufficiently compressed to form a seal with the inner wall of housing 112.

As described above, seal 144 preferably creates a sealing engagement with the inner wall of housing 112 and with a top surface of extending member 121 of filter media element 120. Typically, filter media element 120 (for example, a filter bag) is fabricated from a porous (or otherwise filtering) fabric or other material. In the area of extending member 121, the filtering material or fabric is typically hand sewn to encompass ring 122. The fabric in the area of extending member 121 can become bunched and, in any event, is typically quite irregular in its surface. Forming a seal with both the inner wall of housing 112 and with extending member 121 can thus be difficult. Use of a number of commercially available O-ring type elastomeric seals that were subject to an axially compressive force in several studies was found to be provide an inadequate seal. In general, it is believed that such sealing members are typically too stiff to deform adequately to provide the required seal of either the inner wall of housing 112 or extending member 121 of filter element 120 under an axially compressive force.

In that regard, seal 144 must be sufficiently pliant or yielding to form a seal with the inner wall of housing 112 and form a seal with the irregular surface of extending member 121 using an axially compressive force as provided, for example, by compression plate 142. The present inventor has found that use of an elastomeric seal 144 formed from a relatively thin layer of elastomeric material to have a generally hollow or tubular section 146 with an open or void area 147 (seen enlargement of FIG. 3A) encompassed thereby readily provides the required pliancy or deformability. In that regard, the tubular section 146 is readily deformed to collapse the open area 147. Elasomteric seals 144 suitable for use in the present invention preferably exhibit a stiffness in the range of between approximately 80 to 95 on the Shore Durometer 00 scale (a measure of stiffness or, conversely, pliancy) and more preferably in the range of approximately 80 to 90. In several studies of the present invention, elastomeric seal 144 was fabricated from EPDM rubber (Ethylene Propylene Diene Monomer or Ethylene-Propylene rubber) and had the dimensions (in inches) set forth in FIG. 5B. In this embodiment, seal 144 included outward extending seal elements 148a and 148b. Such edge trim seals 144 having a push-on connection or seating 145 are available, for example, from Hartwell DZUS (a division of McKechnie Ltd) of Placentia, Calif. Several elastomeric seals 144 used in studies of the present invention exhibited an average stiffness of about 88 on the Shore Durometer 00 scale and required approximately 10 lbs of force on compression plate 142 (see FIGS. 4A through 5B discussed below) to form an optimal seal with both the inner wall of housing 112 and with extending member 121. Other material suitable for use in elastomeric seals 144 of the present invention include, but are not limited to, VITON® (a fluoroelastomer available from Dupont-Dow Elastomers), BUNA-N nitrile rubber and silicone.

The greater the stiffness of the material used for seal 144, the greater the axially compressive force that will be required to create an adequate seal with the inner wall of housing 112 and with extending member 121 of filter element 120. However, requiring a relatively large force to compress seal 144 can result in the requirement of adding mechanical means to exert such force. In general, support and sealing devices 140 and 140' of separations systems 10 and 10' can be seated manually without mechanically applying additional compressive force. Additionally, application of a relatively large axially compressive force to a seal in operative connection with extending member 121 and ring 122 can result in deformation of extending member 121 and/or ring 122 and exacerbate the problem of leakage. Preferably, an axially compressive force of 50 lbs or less is applied to compression plate 142 of the present invention. More preferably, a force of 25 lbs or less is applied to compression plate 142. Most preferably, a force of 15 lbs or less is applied to compression plate 142.

In the embodiment of FIGS. 2A through 3B, seal 144 is attached to device 140 as described above. Thus seal 144 is raised and lowered with lid 114. Typically, housing 112 is filled with opaque liquid when lid 114 and operatively connected seal 144 are seated (as, for example, illustrated in FIGS. 3A and 3B). Providing a sealing member that is connected to device 140 help ensures that the seal will be properly seated and facilitate the retrofitting of existing separation systems.

An alternate design may be applied, for example, when a filter lid cannot lift straight up from the top of the filter housing. In such a case, the sliding plate or wire-frame compression member can, for example, be weighted to allow the optimum force on the elastomer seal. Indeed, testing to determine optimum compression in several studies of the present invention was done with incremental weight changes to optimize seal performance. Suitable springs were then selected to replicate this force.

FIGS. 4A through 5C illustrates an embodiment of a separation system 10' of the present invention including a weighted support and seal device 140' that is not connected to lid 114. In this embodiment, housing 112 is identical to housing 112 of FIGS. 2A through 3B. Likewise, support 130 and filter element 120 are also identical. Device 140' includes a handle 155 that facilitates seating thereof. Preferably, handle 155 extends axially upward to facilitate seating within housing 112 (which may be filled with liquid) but does not interfere with seating of lid 114. Annular plate 142 (having an opening 142a through which fluid from inlet 116 passes) has attached thereto a weighting member 154' that provides an axially compressive force on seal 144. As described above, in several studies of the present invention weighting member 154' was approximately 10 lbs.

Although the present invention has been described in detail in connection with the above embodiments and/or examples, it should be understood that such detail is illustrative and not restrictive, and that those skilled in the art can make variations without departing from the invention. The scope of the invention is indicated by the following claims rather than by the foregoing description. All changes and variations that come within the meaning and range of equivalency of the claims are to be embraced within their scope.

What is claimed is:

1. A device for securing a filter element within a housing of a separation system, the housing having an inner wall and including therein a filter seating to seat the filter element, the device comprising:

at least one sealing member adapted to form a sealing connection with the filter element and a sealing connection with the inner wall of the housing; and at least one compression member to compress the sealing member to form the sealing connection with the filter element and the sealing connection with the inner wall of the housing, the compression member being slidably positioned on at least a first rod around which a first biasing spring is positioned, the first biasing spring biasing the compression member to compress the sealing member.

2. The device of claim 1 further comprising at least a second rod around which a second biasing spring is positioned, the compression member being slidably positioned on the second rod, the second biasing spring biasing the compression member to compress the sealing member.

3. The device of claim 1 wherein the compression member comprises a plate.

4. The device of claim 3 wherein the plate comprises an opening through which fluid can pass.

5. The device of claim 4 wherein the plate is operatively connected to a lid for the housing by the first rod.

6. The device of claim 1 wherein the sealing member is formed from a layer of elastomeric material and has void space encompassed by the elastomeric material to facilitate deformation of the seal.

7. The device of claim 1 wherein the sealing member is operatively connected to the compression member.

8. A separation system comprising:
a housing;
a filter seating within the housing;
a filter element adapted to be seated within the filter seating; and
a filter securing device comprising at least one sealing member adapted to form a sealing connection with the filter element and a sealing connection with the inner wall of the housing and at least one compression member to compress the sealing member to form the sealing connection with the filter element and the sealing connection with the inner wall of the housing, the compression member being slidably positioned on at least a first rod around which a first biasing spring is positioned, the first biasing spring biasing the compression member to compress the sealing member.

9. The system of claim 8 wherein the filter element includes an extending member that extends radially outwardly that engages a surface of the seating and wherein the sealing member contacts the extending member.

10. The system of claim 9 further comprising at least a second rod around which a second biasing spring is positioned, the compression member being slidably positioned on the second rod, the second biasing spring biasing the compression member to compress the sealing member.

11. The system of claim 10 wherein the compression member comprises a plate.

12. The system of claim 11 wherein the plate comprises an opening through which fluid can pass.

13. The system of claim 12 wherein the plate is operatively connected to a lid for the housing by the first rod.

14. The system of claim 8 wherein the filter is adapted to remove solid particles from a fluid.

15. The system of claim 8 wherein the sealing member is formed from a layer of elastomeric material and has void space encompassed by the elastomeric material to facilitate deformation of the seal.

16. The system of claim 8 wherein the sealing member is operatively connected to the compression member.

* * * * *